A. W. WILCOX.

Organ Reed-Board.

No. 6,638. Reissued Sept. 7, 1875.

*Witnesses:*
A. McCallum
D. G. Stuart

*Inventor:*
Alfred W. Wilcox
by his atty
P. Hannay

N. PETERS, PHOTO-LITHOGRAPHER, WASHINGTON, D. C.

UNITED STATES PATENT OFFICE.

ALFRED W. WILCOX, OF WORCESTER, MASSACHUSETTS, ASSIGNOR OF ONE-HALF HIS RIGHT TO G. W. INGALLS, OF SAME PLACE.

IMPROVEMENT IN ORGAN REED-BOARDS.

Specification forming part of Letters Patent No. 140,750, dated July 8, 1873; reissue No. 6,638, dated September 7, 1875; application filed August 7, 1875.

DIVISION B.

*To all whom it may concern:*

Be it known that I, ALFRED W. WILCOX, formerly of New Haven, Connecticut, now of Worcester, in the county of Worcester and State of Massachusetts, have invented certain new and useful Improvements in the Construction of the Reed and Valve or Sound Boards of Organs, &c.; and I do hereby declare that the following is a full, clear, and exact description thereof, that will enable others skilled in the art to which it appertains to make and use the same, reference being had to the accompanying drawings and to the letters of reference marked thereon, which form a part of this specification, in which—

Figure 1:
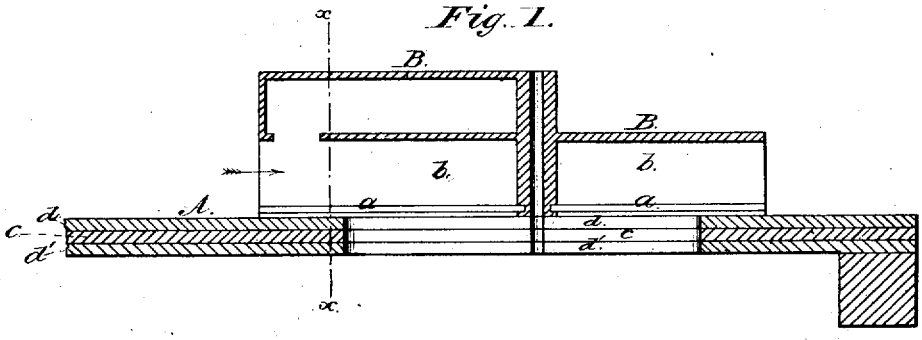
Figure 2:
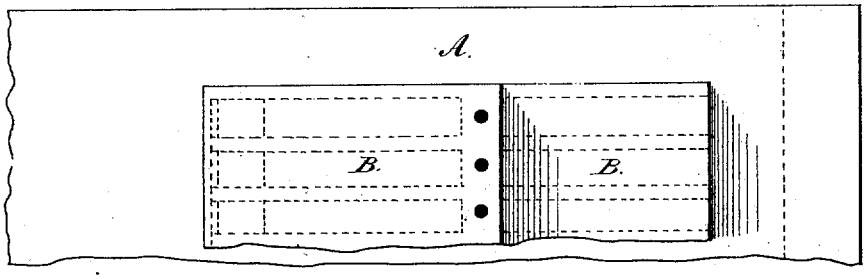

Figure 1 represents a vertical transverse section of a portion of a reed or tube board and sound and valve board constructed on my improved plan. Fig. 2 represent a plan, and Fig. 3 a vertical longitudinal section, of the same.

The ordinary valve and sounding board of a reed-organ, melodeon, or other similar reed instrument is made out of wood of about one-quarter of an inch in thickness, with the grain of the wood running crosswise of the board—*i. e.*, the short way. This construction renders them peculiarly sensitive to the changes of the atmosphere, which sometimes causes them to shrink and sometimes to swell, and not unfrequently to crack, warp, and tilt, and thereby to break or tear away from the reed-board, creating great trouble and loss to the manufacturers. In fact, this is considered the most serious difficulty with which they have to contend, and which heretofore has only been partially remedied by gluing on narrow cross bands or strips around the edges of the valve-board.

To provide a remedy for these troubles is the object of this branch of my improvement, and which consists in combining with the tube or reed board a valve and sounding board constructed of thin veneers laid and glued together, with the grain of the wood of the individual veneers running crosswise of each other.

This construction not only prevents the occurrence of the evils before referred to, but makes a much stiffer, better, and stronger board, and at the same time affords a more secure fastening for solo-stops, and for the mechanical appliances attached thereto.

To enable others skilled in the art to make, construct, and use my invention, I will now describe it in detail, omitting a description of such parts of an instrument as are necessary to a full understanding of the improvement.

The valve and sounding board A is usually made longer than it is wide, the reed or tube board B being then secured to it in the direction of its length. So far as my present improvement is concerned, the tube-board may be made and attached, and the valve-slots cut, in any of the well-known modes of doing these things. The reeds *a* may also be made and inserted in the cells or tubes *b*, in any known way.

Figure 3:
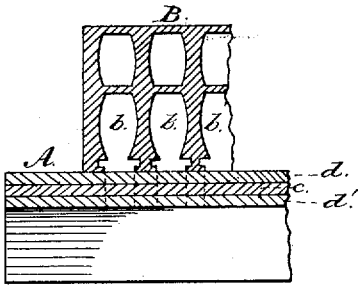

The valve and sounding board A, however, instead of being made of one thickness of wood, as heretofore made, I form of two or more thicknesses of wood, three being preferred—as, for instance, of three thin veneers laid crosswise of the grain to the other, and then glued together, as shown in Figs. 1 and 3—that is to say, the grain of the two outer sheets *d d'* run in one way, while the grain of the middle or third one, *c*, runs in the opposite direction. The grain of the two outer sheets *d d'* should be made to run crosswise of the board, and the middle one, *c*, lengthwise. This gives greater strength and rigidity to the board than if their directions were reversed, as the strength of the single thickness *c*, the grain of which runs lengthwise of the valve-board, is powerfully re-enforced by the tube-board B, which also runs in the same direction.

If desired, an additional veneer may be added, the grain of which should run with that of the grain of the middle layer, *c*, and as many more may be added, upon the same principle, as the judgment of the builder may deem advisable; but, as a rule, three thicknesses are deemed sufficient for all practical purposes.

This construction gives great strength and rigidity to the board, and completely overcomes its liability to warp or twist, and its consequent tendency to tear loose from the tube or reed board when suitably secured thereto.

Having described my improvement, what I claim as new, and desire to secure by Letters Patent, is—

The combination of a valve and sounding board, A, constructed of thin veneers laid and glued together crosswise of the grain, with the tube or reed board B of a musical instrument, substantially as and for the purpose set forth.

In testimony that I claim the foregoing I have hereunto set my hand this 7th day of July, 1875.

ALFRED W. WILCOX.

Witnesses:
DAVID MANNING, Jr.,
ALFRED D. WARREN.